United States Patent Office 2,959,096
Patented Nov. 8, 1960

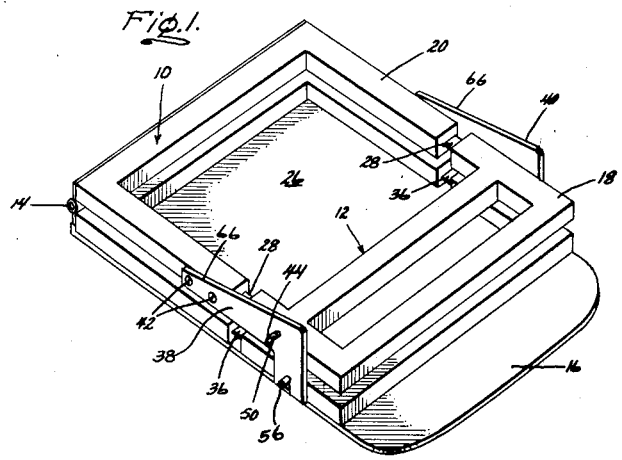
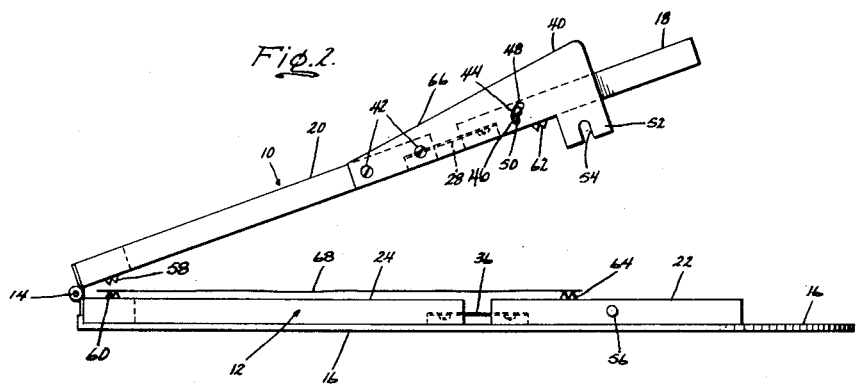
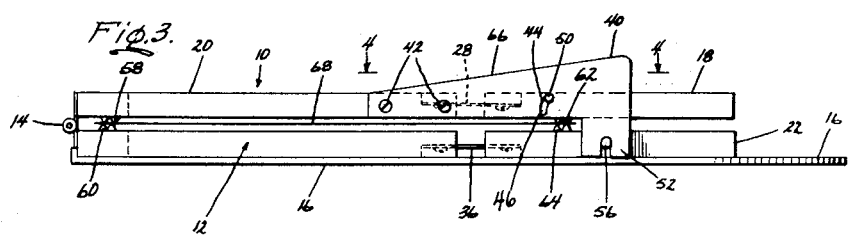
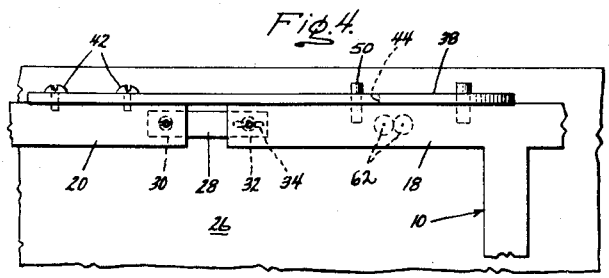
Inventors:
Sheldon H. Hine,
Harold D. Bobeck,
by Just & Drish
Attorneys.

2,959,096

PHOTOGRAPHIC NEGATIVE CARRIER

Harold D. Bobeck, 1617 Wood Moor, and Sheldon H. Hine, 2538 John St., both of Fort Wayne, Ind.

Filed Sept. 11, 1958, Ser. No. 760,426

7 Claims. (Cl. 88—24)

This invention relates to a negative carrier, and more particularly to a photographic negative carrier which is operable to stretch and flatten a negative while the carrier is being used.

Negative carriers are used in connection with photographic enlargers for holding a negative in place while making a photographic exposure or reproduction from the negative. Such carriers customarily are of two types, one type comprising two sheets of glass between which the negative is sandwiched and the second comprising two open frames which clamp over the margins only of the negative. Both of these carriers are used by positioning the light head of the enlarged over the negative to produce an exposure.

In the glass-plate carrier, the glass plates may be carried by hinged frames or the like which may be manipulated to remove and replace a negative between the two plates. Such glass-plate carriers are of advantage as to flattening the negative during the enlargement exposure so the negative is accurately positioned in the optical plane of the enlarger, but this advantage is largely offset by the disadvantages of image degradation resulting from the multiple reflections from the four surfaces of the two glass plates. Furthermore, dust, dirt and foreign matter collecting on the glass plates reproduce as spots, smudges and scratches which dilute and contaminate the reproduced picture.

In the above glassless carrier, no negative-flattening means is used, thus permitting the negative to buckle and wrinkle. Such buckles and wrinkles are not desired, since these sections fall ouside the focal plane of the enlarger thereby producing a projected image which is not properly focused, or, in other words, is not sharp. Glassless carriers which both grip and stretch the negative have the disadvantage of complexity of construction, requiring separate, manual operations for (1) gripping the negative then (2) stretching the negative to remove all buckles and wrinkles.

The present invention is primarily concerned with providing a carrier which does not possess the disadvantages inherent in the above-discussed arrangements, but at the same time makes available the advantages thereof.

It is therefore an object of this invention to provide a negative carrier which is efficiently capable of stretching and holding a negative in position without the use of any supporting glass plates.

It is another object of this invention to provide a negative carrier capable of gripping and stretching flat a negative in two distinct phases of operation, the first operative phase being to grip the negative and the second operative phase being to stretch and flatten the negative.

It is yet another object of this invention to provide a negative carrier capable of holding and flattening a negative in response to the proper operation of properly designed photographic enlargers or the like used in conjunction with the carrier.

Other objects will become apparent as the description proceeds.

To the accomplishment of the above and related objects, the invention may be embodied in the forms illustrated in the accompanying drawings, attention being called to the fact, however, that the drawings are illustrative only, and that specific change may be made in the specific constructions illustrated and described, so long as the scope of the appended claims is not violated.

In the drawings:

Fig. 1 is a perspective illustration of one embodiment of this invention;

Fig. 2 is a side-elevation thereof showing the two clamping frames swung apart to receive a negative;

Fig. 3 is a side-elevation similar to Fig. 2 but with the two clamping frames closed and gripping a photographic negative therebetween; and Fig. 4 is a fragmentary top plan view taken substantially along section line 4—4 of Fig. 3.

Referring to the drawings, the carrier comprises upper and lower frames generally indicated by the reference numerals 10 and 12, respectively. Preferably, these frames 10 and 12 are constructed identically and are hinged at 14 along their rear edges so as to be relatively swingable into and out of superposed position. Fig. 2 illustrates the two frames as being opened and Fig. 3 shows the two frames as being closed or superposed. The two frames are rested on a base 16 having a flat upper surface. Each frame 10 and 12 is substantially square or rectangular and is divided into front and rear sections, respectively. Front and rear sections 18 and 20 compose the upper frame 10, while front and rear sections 22 and 24 compose the lower frame 12. Considering only the upper frame 10, the two sections 18 and 20 define a rectangular shape and circumscribe a rectangular opening 26. The two sections, however, are spaced apart, as shown, with the adjacent ends thereof being joined together by two spring plates 28 which are received in recessed slots. As seen in Figs. 3 and 4, the left-hand end of each plate 28 is fixedly secured to the frame section 20 by means of a screw 30 while the right-hand end is secured to the front section 18 by means of a screw 32 and slot 34 connection. The slot 34 extends longitudinally of the plate 28 and also longitudinally of the side of the frame 10. The pin and slot connection 32, 34 is sufficiently loose as to permit the front frame section 18 to move toward and away from the rear section 20, and the recessed portion in the front section 18, which receives the right-hand end of the plate 28, is just large enough to permit relative movement but prevents any lateral displacement between the two sections 18 and 20. The two plates 28 being flat and of spring material, the two sections 18 and 20 may be swung to a limited extent in a vertical direction relative to each other.

The lower frame 12 is similarly constructed to frame 10, the two frame sections 22 and 24 being separated and joined together by two spring plates 36 which may be identical to the two plates 28. These plates 36 are secured to the front and rear sections 22 and 24 in the same manner as are the plates 28 to the respective two frame sections. Thus, the two frames 10 and 12, being substantially identically constructed, may be congruently superposed upon each other, as shown in Fig. 3.

Two cam plates 38 and 40 are secured to the opposite sides, respectively, of the upper frame 10. As shown more clearly in Figs. 2 and 4, two screws 42 are used to fasten each cam plate to its respective side of the rear frame section 20. Each cam plate 38, 40 extends forwardly alongside the front sections 18 and 22. A two-action cam slot 44 is provided in each plate 38 and 40, the lower portion 46 of this slot being substantially vertical and the upper portion 48 being inclined upwardly and forwardly. Two pins 50 extending laterally from the opposite sides of the front section 18 enter the respective cam slots 44. Thus, vertical relative movement between the two cam plates 38 and 40 and the front frame section 18 results in movement of the frame section in accordance with the sliding engagement of the pins 50 with the respective slots 44.

The cam plates 38 and 40 each have a depending ear at the forward end thereof which overlies the front section 22 of the lower frame when the two frames 10 and 12 are superposed as shown in Fig. 3. Each ear 52 is provided with a vertical slot 54 which is engageable with a respective one of two laterally projecting locking pins 56 on the lower front section 22.

Embossments, pins or the like 58 are provided on the underside of the rear portion of frame 10 and other similar embossments, pins or gripping elements 60 are provided on the contiguous portion of the lower frame 12 as shown. Preferably, these gripping elements 58 and 60 are metallic embossments suitably pointed and secured to the respective frame sections, the embossments on the lower section being staggered or offset slightly from those of the upper section.

Similar embossments 62 and 64 are provided on the front frame sections 18 and 22, respectively, and preferably are also staggered or offset slightly from each other, for a purpose which will become apparent from the following explanation. Two sets of the gripping elements 58 and 60 are used at the rear of the two frames 10 and 12, one set being disposed near one corner of the two frames and the other set being disposed near the other corner. Similarly, the gripping elements 62 and 64 are divided into at least two sets, one set being in one corner and the other set in the other corner of the two frame sections 18 and 22.

The two cam plates 38 and 40 are inclined along the upper edges 66 as shown.

In operation, the two frames 10 and 12 are swung apart to the position shown in Fig. 2. A photographic negative, as indicated by the numeral 68 and having a size which corresponds to the carrier opening 26 (Fig. 1), is laid on the lower frame 12 over the opening 26. The margins of the negative 68 are laid over the gripping elements 60 and 64. Obviously, the frames must be of such size and preadjusted to fit a particular negative which is to be exposed. Next, the frame 10 is lowered until it rests on the lower frame 12. However, the moment the frame 10 is moved a slight amount downwardly, the gripping elements 58 in cooperation with the elements 60 forcefully engage and thereby grip the edge of the negative. When the frame 10 is lowered further, the forwardmost gripping elements 62 and 64 engage the front or forward marginal edge of the negative, and when completely lowered the slots 54 in the respective cam plates engage the locking pins 56, thereby locking the two front frame sections 18 and 22 together and against any relative movement with respect to each other. At this moment, the gripping elements 62 and 64 are merely resting on each other and have not as yet securely gripped the negative in place. The carrier is next inserted into the enlarging equipment (not shown) until the negative is properly positioned with respect to the lens head. As is usual, the light head is lowered over the negative and, in the present instance, when this occurs, the light head housing engages the upper edges 66 of the two cam plates 38 and 40, forcing the cam plates downwardly relative to the two front frame sections 18 and 22. During the initial stage of this downward cam movement, only the portion 46 of the cam slot will engage the respective pin 50, whereupon the gripping elements 62 and 64 are thrust together so as to grip securely the negative therebetween. Further downward adjusting of the lens head forces the two cam plates 38 and 40 still further downwardly, whereupon the respective cam pins 50 enter the upper portions 48 of the cam slots, thereby forcing the locked front sections 18 and 22 forwardly (Fig. 3). This forward movement of these two frame sections 18 and 22 thereupon stretches the negative 68 until it is perfectly flat and free of all wrinkles. The enlarging equipment is now utilized in the customary manner, following which the lens head is withdrawn from the carrier, whereupon the upper frame 10 may be opened to the position shown in Fig. 2 for removing the negative 68.

When the two cam plates 38 and 40 are fully actuated to their lowermost positions, the two front sections 18 and 22 will be moved forwardly with respect to the rear sections 20 and 24 of the two frames 10 and 12, and this is more clearly shown in Fig. 3.

Recapitulating, the invention is so arranged that the two normal phases of operation are (1) gripping the negative preparatory to stretching or flattening, and (2) actual stretching of the negative following the gripping, both phases being performed automatictlly in sequence in one continuous downward motion of the upper frame as results from the force of the enlarger light-head on the cam plates 38 and 40.

What is claimed is:

1. A negative stretcher comprising a base having a substantially flat upper surface, first and second flat two-part frames disposed on said surface, the second frame being congruently superposed on the first frame, the two parts of each frame defining a rectangle having two opposite end members and two opposite side members, each of said side members being divided into two longitudinally spaced elements, the adjacent ends of each two elements being joined by a plate of spring material, said plate having a lost motion pin and slot connection with the respective elements for providing relative longitudinal movement therebetween, each plate lying in a plane substantially parallel to the plane of said frames whereby the two parts of each frame may swing relative to each other, the end member of one part of said first frame being hingedly connected to the end member of one part of said second frame along a hinge axis substantially parallel to the plane of said frame, two cam plates securely mounted on the opposite side elements respectively of said one part of said second frame, each cam plate having a cam slot, said cam slot having a lower portion which extends substantially vertically and an upper portion which inclines upwardly and away from said hinge axis, two pins laterally extending from the side elements of the other part of said second frame, said pins being received by the slots of the respective cam plates, said cam plates being tapered along the upper edges thereof and having downwardly depending ears which extend over the opposed side elements respectively of the other part of said first frame, said ears each having a vertically arranged slot therein, two locking pins extending laterally from said side elements respectively of said first frame other part and being selectively engageable with the slots in the respective ones of said ears, raised gripping elements on said first and second frames adjacent to said hinge connection, and raised cooperative arranged gripping elements on said other parts of said first and second frames.

2. A negative stretcher comprising two superposed frames each having two opposite end and side members, each frame being divided into substantially coplanar front and rear sections which are spaced apart and joined respectively by flat spring plates, said spring plates lying in the plane of said frames and having lost motion connections with the respective front and rear sections of said frames whereby said sections of each frame may move longitudinally relative to each other, said frames being hingedly connected at the rear ends thereof, the hinge axis being substantially parallel to the plane of said frames, the rear section of the upper frame carrying two cam plates on the sides thereof, said cam plates extending alongside the front section of said upper frame, each cam plate having an angular slot which has a vertical portion at the lower end and an upwardly forwardly inclined portion at the upper end, two laterally outwardly extending pins on said front section of said upper frame, said two pins being received by the two slots respectively in said cam plates, said cam plates having ears which depend alongside the lower frame, said ears each having a vertical slot, two locking pins extending laterally from the front section of the lower frame, said two locking pins being selectively engageable with the two slots respectively in said ears, and gripping elements protruding from the contiguous surfaces of the opposite end portions of said two frames.

3. A negative stretcher comprising two superposed frames each having two opposite end and side members, each frame being divided into substantially coplanar front and rear sections, the two sections of each frame being movably connected together, said frames being movably connected together, said frames being hingedly connected at the rear ends thereof, the hinge axis being substantially parallel to the plane of said frames, the rear section of the upper frame carrying two cam plates on the sides thereof, said cam plates extending alongside the front section of said upper frame, each cam plate having an angular slot which has a vertical portion at the lower end and an upwardly forwardly inclined portion at the upper end, two laterally outwardly extending pins on said front section of said upper frame, said two pins being received by the two slots respectively in said cam plates, said cam plates having ears which depend alongside the lower frame, said ears each having a vertical slot, two locking pins extending laterally from the front section of the lower frame, said two locking pins being selectively engageable with the two slots respectively in said ears, and gripping elements protruding from the contiguous surfaces of the opposite end portions of said two frames.

4. A negative stretcher comprising two superposed frames each having two opposite end and side members, each frame being divided into substantially coplanar front and rear sections, the two sections of each frame being movably connected together, means connecting the rear sections of said frames together for preventing relative movement therebetween when they are superposed, the rear section of the upper frame carrying two cam plates on the sides thereof, said cam plates extending alongside the front section of said upper frame, each cam plate having an angular slot which has a vertical portion at the lower end and an upwardly forwardly inclined portion at the upper end, two laterally outwardly extending pins on said front section of said upper frame, said two pins being received by the two slots respectively in said cam plates, said cam plates having ears which depend alongside the lower frame, said ears each having a vertical slot, two locking pins extending laterally from the front section of the lower frame, said two locking pins being selectively engageable with the two slots respectively in said ears, and gripping elements protruding from the contiguous surfaces of the opposite end portions of said two frames.

5. A negative stretcher comprising two superposed frames each having two opposite end and side members, each frame being divided into substantially coplanar front and rear sections, the two sections of each frame being movably connected together, means connecting the rear sections of said frames together for preventing relative movement therebetween when they are superposed, means selectively locking both of said front sections against movement in a direction parallel to the plane of said frames when said front sections are superposed, the rear section of the upper frame carrying two cam plates on the sides thereof, said cam plates extending alongside the front section of said upper frame, each cam plate having an angular slot which has a vertical portion at the lower end and an upwardly forwardly inclined portion at the upper end, and two laterally outwardly extending pins on said front section of said upper frame, said two pins being received by the two slots respectively in said cam plates.

6. A negative stretcher comprising two superposed frames each having two opposite end and side members, each frame being divided into substantially coplanar front and rear sections, the two sections of each frame being movably connected together, means connecting the rear sections of said frames together for preventing relative movement therebetween when they are superposed, means selectively locking both of said front sections against movement in a direction parallel to the plane of said frames when said front sections are superposed, means operatively connected between the front and rear sections of said two frames for moving said front sections a limited distance away from said rear sections when said two frames are superposed, and gripping elements on the contiguous front and rear portions of said front and rear sections respectively.

7. A negative stretcher comprising two superposed frames each having two opposite end and side members, each frame being divided into substantially coplanar front and rear sections, the two sections of each frame being movably connected together, means connecting the rear sections of said frames together for preventing relative movement therebetween when they are superposed, means selectively locking both of said front sections against movement in a direction parallel to the plane of said frames when said front sections are superposed, means operatively connected between the front and rear sections of said two frames for moving said front sections a limited distance away from said rear sections when said two frames are superposed, and means on said frame sections for gripping a negative which is interposed between said frames.

References Cited in the file of this patent
UNITED STATES PATENTS
2,824,491    Hoffmaster _____ Feb. 25, 1958